Figure 1:
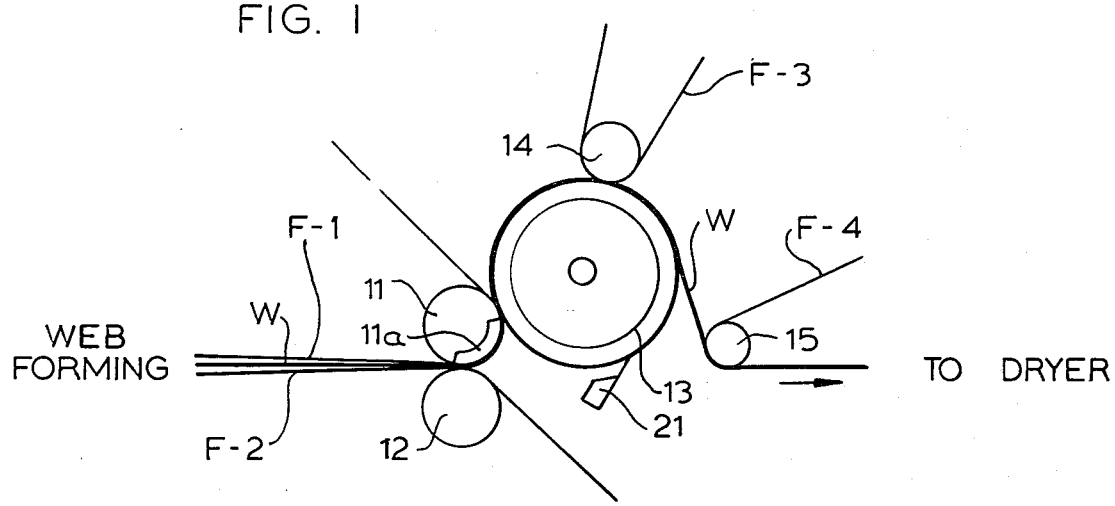

| United States Patent [19] | [11] | 4,316,769 |
|---|---|---|
| Dahl | [45] | Feb. 23, 1982 |

[54] CENTRIFUGALLY CAST CHILLED IRON ROLL

[75] Inventor: Carl B. Dahl, Rockton, Ill.

[73] Assignee: Beloit Corporation, Beloit, Wis.

[21] Appl. No.: 88,342

[22] Filed: Oct. 26, 1979

[51] Int. Cl.³ .............................................. D21F 3/02
[52] U.S. Cl. ............................................... 162/360 R
[58] Field of Search ...................... 29/132, 130, 129.5; 162/358, 360 R; 100/121, 188, 162, 170, 176

[56] References Cited

U.S. PATENT DOCUMENTS

| 3,000,778 | 9/1961 | Sively et al. | 162/358 |
| 3,014,266 | 12/1961 | Samuels et al. | 29/130 |
| 3,416,435 | 12/1968 | Dahl et al. | 29/130 |

FOREIGN PATENT DOCUMENTS 2086561  12/1971  France .................................. 29/132

*Primary Examiner*—Peter Chin
*Attorney, Agent, or Firm*—Hill, Van Santen, Steadman, Chiara & Simpson

[57] ABSTRACT

A roll for handling a wet web in a paper making machine having a central supporting core with bearings at the ends and an outer annular layer surrounding the core formed by centrifugal casting and having a content of chrome in the range of 15% to 35% with a finished outer smooth surface so that the surface has a superior wetting characteristic and releases a wet low strength paper web from the surface.

3 Claims, 2 Drawing Figures

CENTRIFUGALLY CAST CHILLED IRON ROLL

BACKGROUND OF THE INVENTION

The invention relates to improvements in paper making machines, and more particularly improvements in rolls for a press section wherein the roll has a superior wetting characteristic for the easy and gentle release of a wet web having a low wet strength.

In paper making machines a web is typically formed in a forming section and is carried on through a press section, then to a dryer section and then to a calender. In the press section, the wet web passes over rolls, in some instances supported by felts and in other instances, directly in contact with the surface of the roll so that on the offrunning side of the roll, the web must be separated from the roll surface. The tension created in the web by being pulled off of the roll surface is critical, and it is essential, particularly for handling and transferring a lightweight low wet strength ground wood sheet that the roll readily release the sheet. To attain this operation without danger of tearing the sheet, the roll must of necessity have good wetting characteristics so that a film of water is always present on the roll surface to insure sheet release. For this purpose, it has heretofore been customary to provide a granite roll with a granite outer surface to achieve this good wetting characteristic. An example of such a granite roll is shown in the Hill patent, U.S. Pat. No. 3,737,962. Disadvantages accompany the provision of granite rolls in that such rolls are more expensive to manufacture than the conventional metal rolls. Further, granite rolls do not have the bending strength of metal rolls and in very wide machines, do bend more than desirable. The construction and maintenance of granite rolls is more expensive than metal rolls, and the difficulties encountered with providing an annular granite shell for a granite roll are indicated in the aforementioned U.S. Pat. No. 3,737,962.

In the manufacture of conventional large metal press rolls, a process which has been adapted is generally known as centrifugal casting, and an example of such a process is shown in the Justus et al U.S. Pat. No. 3,414,044 wherein a multilayered roll is shown with a chill iron outer layer.

I have discovered that a roll with superior wetting characteristics is provided by making a roll by the centrifugal casting process wherein the outer layer is of iron with substantially 25% chromium content. This roll attains the strength characteristics of a conventional cast iron roll and is relatively inexpensive to manufacture as contrasted with a granite roll, and avoids the disadvantages of low strength and expense accompanying a granite roll. Yet, the chrome containing outer layer has superior wetting characteristics so as to provide good release of a web by maintaining a continual layer of water on the outer surface for release of a wet web, and particularly for the easy release of a low wet strength lightweight ground wood sheet.

For manufacture of this roll, a centrifugal annular mold is provided and a first ladle is poured into the roll of substantially 25% chrome iron. A second ladle of cast iron is poured and the roll is formed by centrifugal casting. The chrome iron roll has the same desirable wetting characteristics as a granite roll. The chrome containing roll is also corrosion resistant, and it has a hard surface for better wear resistance from doctors. The versatility of the chrome containing roll is greater than a granite roll. For example, such a roll can be manufactured as a controlled crown roll wherein the roll can be supported or bent to achieve certain crowning effects or to compensate for deflection due to nip pressures in a manner not possible with a granite roll.

Accordingly, an object of the present invention is to provide a roll for a press section in a paper making machine having an outer surface with good wetting characteristics which is less expensive to manufacture and to maintain than a granite surfaced roll.

A further object of the invention is to provide an improved press roll which avoids the disadvantage present with a granite roll and provides better surface wear and better deflection characteristics than a granite roll.

Other objects, advantages and features, as well as equivalent structures and methods, will become more apparent with the teaching of the principles of the present invention is connection with the disclosure of the preferred embodiment in the specification, claims and drawings, in which:

DRAWINGS

Figure 2:
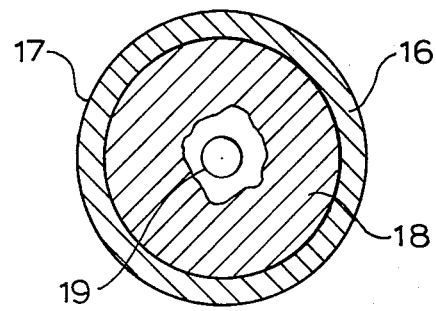

FIG. 1 is a somewhat schematic side elevational view of a portion of a dryer section of a paper making machine incorporating a roll constructed and operating in accordance with the principles of the present invention; and FIG. 2 is an end view showing a section taken through the press roll of FIG. 1.

DESCRIPTION

As illustrated in FIG. 1, a paper web is formed in a web forming section of a machine shown schematically at 10 and is carried onto a dryer section on a felt F-1, with the web being indicated at W.

The web passes through a first nip between the upper felt F-1 and a lower felt F-2 with the nip being formed between a pair of press rolls 11 and 12. The web will follow on the uprunning side of the roll 11 due to a suction gland 11a within the open roll 11 and pass into a nip between the roll 11 and 13.

The roll 13 is a press roll which has a smooth finished outer surface and receives the web directly in contact with its outer surface. The web is carried upwardly such as into another nip formed between the roll 13 and a press roll 14. A felt F-3 passes down over the press roll 14 with the web continuing to be carried on the outer surface of the roll 13. On the downrunning side of the roll 13, the web is separated from the roll at location 20 and is threaded over a roll 15 over which passes a felt F-4. At the point of separation 20, the web must easily separate from the roll 13, and this is accomplished due to the high wetability index of the outer surface of the roll 13. That is, the roll 13 must carry a film of water on its surface. The web can still be quite wet at this location, and has a low wet strength, particularly if it is formed of a lightweight sheet and formed of short fibered stock such as ground wood.

On the downrunning side of the roll 13 is positioned a doctor 21 with the blade in close running contact with the surface of the roll 13 to keep the surface clean. The wearing qualities of the instant roll are superior to a granite roll and will prevent grooving and the consequent necessity for refinishing the roll.

To achieve the roll 13 with an outer surface of high wetability index, the roll is formed by a centrifugal cast process and the first ladle poured into the annular mold is of molten iron having a content of substantially 25% chromium. While 25% is an optimum content, chromium content in the ranges of 15% to 35% are suitable. The mold is rotated and a core is formed by a ladle of cast iron poured to form the core 18. At the ends of the roll are attached bearings shown at 19. The outer surface 17 of the roll is polished and finished. The outer shell 16 has a good wetability index, and the roll has the strength of an iron roll which is much superior to a granite roll. The roll is thus adaptable to be used in very wide machines, and roll bending equipment can readily be used.

It is also possible to provide a press roll of this type in the form of a hollow shell wherein the outer layer is formed of a chrome containing iron, and an annular layer formed of cast iron. The hollow shell is then used in a press arrangement with supporting shoes opposite the nip to provide a crown controlling structure. Such structure is illustrated in the Justus patent U.S. Pat. No. 3,276,102.

As stated above, the chrome content can be 15% to 35%, however, the chrome must be high enough so that the surface does not corrode. 25% will do this, and it may be possible to go lower, but too low a chrome content may result in pitting of the surface in some paper mill environments. The chrome inhibits corrosion and promotes chill (hardness). Hardness is necessary so that the surface can be doctored without excessive wear.

I claim as my invention:

1. In a press section of a papermaking machine, the combination comprising:

a plurality of press rolls arranged in pressing relationship;

means for guiding a wet web into said press rolls for water removal;

and at least one of said rolls having an outer annular layer surrounding and supported by a core consisting of cast iron, said outer layer formed of an iron having a content of chrome in excess of 15% and no greater than 35% for forming a smooth exterior surface of said roll permitting non-picking separation of said web from said roll with no external lubrication of said surface.

2. In a press section of a paper making machine the combination of claim 1 wherein the chrome content is substantially 25%.

3. In a press section of a paper making machine the combination of claim 1 wherein the roll is formed by rotational centrifugal casting.

* * * * *